United States Patent
Bender et al.

(10) Patent No.: US 12,000,324 B2
(45) Date of Patent: Jun. 4, 2024

(54) VEHICLE COOLANT RESERVOIR

(71) Applicant: Deere & Company, Moline, IL (US)

(72) Inventors: Jesse J. Bender, Waterloo, IA (US); Noah F. Homan, Waterloo, IA (US); Jade E. Bender, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/532,045

(22) Filed: Nov. 22, 2021

(65) Prior Publication Data
US 2023/0160332 A1 May 25, 2023

(51) Int. Cl.
*F01P 11/02* (2006.01)
*B62D 25/08* (2006.01)
*F01P 11/14* (2006.01)

(52) U.S. Cl.
CPC .......... *F01P 11/028* (2013.01); *B62D 25/082* (2013.01); *F01P 11/14* (2013.01)

(58) Field of Classification Search
CPC ........ F01P 11/028; F01P 11/14; B62D 25/082
See application file for complete search history.

(56) References Cited

U.S. PATENT DOCUMENTS

| | | | | | |
|---|---|---|---|---|---|
| 3,653,364 | A | * | 4/1972 | Bogan | F02M 21/00 422/162 |
| 3,757,984 | A | * | 9/1973 | Barton | F01P 11/029 123/41.14 |
| 4,479,460 | A | * | 10/1984 | Webber | F01P 11/02 123/41.27 |
| 4,677,943 | A | * | 7/1987 | Skinner | F01P 11/02 123/41.27 |
| 5,044,430 | A | * | 9/1991 | Avrea | F01P 11/02 165/104.32 |
| 5,970,928 | A | * | 10/1999 | Smietanski | F01P 11/028 123/41.54 |
| 2016/0186645 | A1 | * | 6/2016 | Rollinger | F01P 7/16 701/102 |

(Continued)

FOREIGN PATENT DOCUMENTS

| | | |
|---|---|---|
| CN | 110985191 A | 4/2020 |
| DE | 102005054964 A1 | 5/2007 |

(Continued)

OTHER PUBLICATIONS

Extended European Search Report and Written Opinion issued in European Patent Application No. 22202825.0, dated Apr. 21, 2023, in 08 pages.

*Primary Examiner* — Long T Tran
(74) *Attorney, Agent, or Firm* — Tucker Ellis LLP; Michael G. Craig; Heather M. Barnes (57) ABSTRACT

One or more techniques and/or systems are disclosed for a new coolant tank that may also provide a structural element to the frame of the engine compartment. The coolant tank is comprised of a rear wall that also makes up a portion of the firewall in the engine compartment. A structural coolant tank component is engaged with the rear wall to form the coolant reservoir. The coolant reservoir can provide support to attach structural elements of the vehicle, and can also allow for improved space efficiency in the engine compartment. Further, improved access to the filling port is provided, while continued operation and desired function is maintained even at extreme vehicle tilt.

20 Claims, 10 Drawing Sheets

(56) References Cited

U.S. PATENT DOCUMENTS

| | | | | |
|---|---|---|---|---|
| 2016/0186647 A1* | 6/2016 | Styron | ............ | F01P 11/029 |
| | | | | 123/41.02 |
| 2017/0218891 A1* | 8/2017 | Zoner | ............ | F02B 29/0437 |
| 2020/0149463 A1* | 5/2020 | Trythall | ............ | B01D 36/001 |

FOREIGN PATENT DOCUMENTS

| | | |
|---|---|---|
| DE | 102018203948 B3 | 7/2019 |
| WO | WO 0139949 A2 | 6/2001 |
| WO | WO 03053768 A1 | 7/2003 |

\* cited by examiner

VEHICLE COOLANT RESERVOIR

BACKGROUND

Vehicles of all types often have an engine coolant system that provides cooling for the engine. Vehicle coolant systems can comprise a reservoir tank that holds an appropriate amount of engine coolant for the system, piping/plumbing that directs the flow of coolant to various parts of the engine and coolant system, a radiator to disperse heat from the coolant system, a water pump, and more. Recently, coolant tanks are constructed from a polymer material made to withstand expected temperatures, with various connection points to the plumbing system. In some instances, a modular design of the tank is provided so that it may be used in a variety of vehicles across a vehicle platform. The coolant reservoir tanks are typically disposed within the engine compartment of the vehicle. A shape and size of the tank can limit the location for the tank in the engine compartment; and in vehicles with larger engines, more than one tank may be used to accommodate the amount of coolant needed with the shape and size of the tank. Due to these limitations, access to the tanks for viewing fill levels, service, filling, etc. is also very limited, and often not user friendly.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a new coolant tank that may also provide a structural element to the frame of the engine compartment. In this way, space saving is provided in the engine compartment, along with improved use, access, maintenance, and filling of the tank. In one implementation, the new coolant tank can be integrated with the firewall between the engine compartment and the operator position. In this implementation, the tank can be made from a structurally supportive material, such as a metal or metal alloy, which can be formed into a target shape for the target vehicle platform. The shell of the tank can act a supportive frame and can comprise attachment locations that allow for attachment of vehicle component, such as fenders, hood hinges, support rails or frames, and other components. In some implementations, a site glass can be disposed on an operator side of the firewall for easy viewing of the fill level of the tank. Additionally, in some implementations, the internal structure can be configured to provide for access to the stored coolant even when the vehicle is tilted due to ground conditions.

In one implementation of a system for a vehicle engine coolant tank, a firewall panel disposed at a rear end of an engine compartment. Further, a coolant reservoir component is operably engaged with the firewall panel to form a coolant reservoir. In this implementation, the coolant reservoir component comprises a fill port to operably add coolant to the coolant reservoir. The firewall panel forms a wall of the coolant reservoir, and the coolant reservoir component is shaped and sized to operably fit inside the engine compartment.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, a vehicle coolant tank can be devised that takes up less space in an engine compartment, while providing secure and sufficient support locations for other vehicle components. Typical and current engine coolant tanks are plastic bottles that are fit into engine compartments without much thought on how they affect the design of the compartment. Particularly when dealing with larger vehicles, such as trucks, construction equipment and agricultural equipment, the coolant tank may take up significant room in the compartment, and be difficult to access, especially when more than one tank is need to provide sufficient amount of storage in a reservoir. With the addition of a second tank there comes additional plumbing, sensor and attachment issues.

In this aspect, in one implementation, a coolant reservoir (a.k.a. tank) for a vehicle can be formed as a structural component of the vehicle. When combined with a rear firewall of the engine compartment, it can help free up engine compartment space while providing an attachment point for structural support to other vehicle components that are typically attached to the vehicle's frame. Further, the tank can be configures to allow for proper use and function even when the vehicle (hence the engine compartment) is tilted up to thirty degrees, such as when moving along slopes. Additionally, a fluid level indicator can be disposed at a location easily accessible to the vehicle operator; and a fill port can also be made readily accessible to the operator without modification of the vehicle hood.

Figure 1:
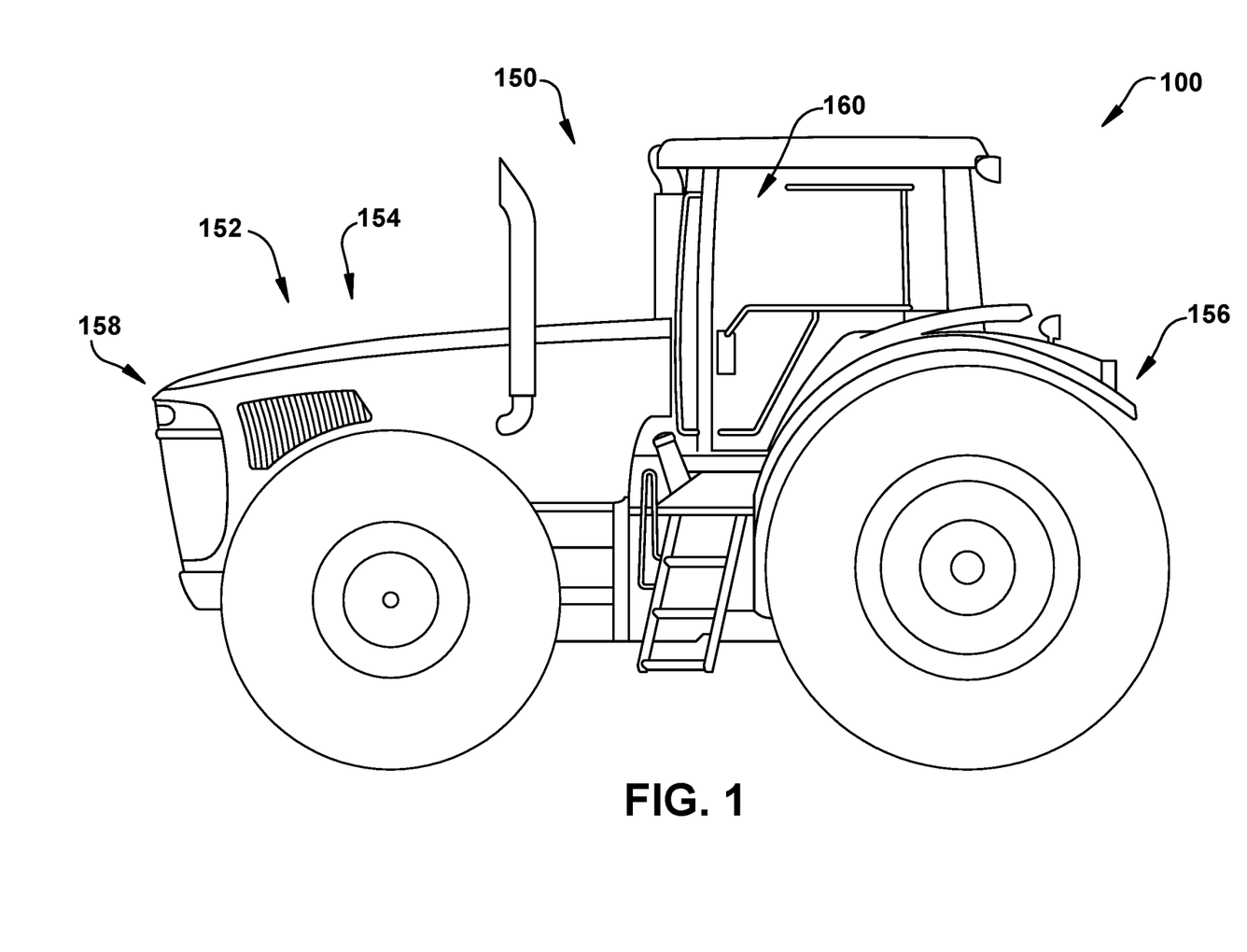
FIG. 1 is a component diagram illustrating one environment where the coolant reservoir system described herein may be implemented.

FIG. 1 is a component diagram illustrating an example implementation of an example use of the coolant reservoir (tank) described herein. In this example, an agricultural or construction vehicle 150, such as a tractor, hauler, or the like, can be powered by an engine 154. The vehicle has a front 158 and a rear 156. In this example, the engine 154 is disposed in an engine compartment 152 at the front 158 of the vehicle (e.g., although engines can be disposed mid-vehicle, or at the rear of the vehicle). The engine compartment 152 typically houses the engine and other powertrain components, including an engine cooling system. In this example, the engine cooling system comprises a coolant reservoir or tank that holds coolant that is used by the coolant system, such as to flow through the engine for cooling, and to the radiator to extract heat, and into the reservoir for reuse. Essentially, the coolant reservoir is a tank that holds excess coolant that is not being used by the rest of the cooling system at that time, but can also serve multiple other functions, such as for de-aeration, over-pressure protection, a system filling point, etc.

With continued reference to FIG. 1, FIGS. 2A, 2B, and 2C are component diagrams illustrating one example implementation of a coolant reservoir system 200, as described herein. In this example, the coolant reservoir system 200 comprises a firewall panel 202 disposed at a rear end of the engine compartment 152. As an example, as illustrated in FIGS. 4A, 4B, 5A, and 5B, described further below, a firewall 450 typically defines a rear end of the engine compartment 152, and it separates the engine compartment 152 from an operator's compartment 160, 452 and/or outside of the engine compartment 152. As the name implies, for example, the firewall is often used as a barrier against heat and/or fire, and is sometimes structurally supported by the vehicle's frame or chassis. In this implementation, at least a portion of the firewall (e.g., 450) can comprise a panel (e.g., 202) that forms a rear wall of the coolant reservoir 240.

Figure 2A:
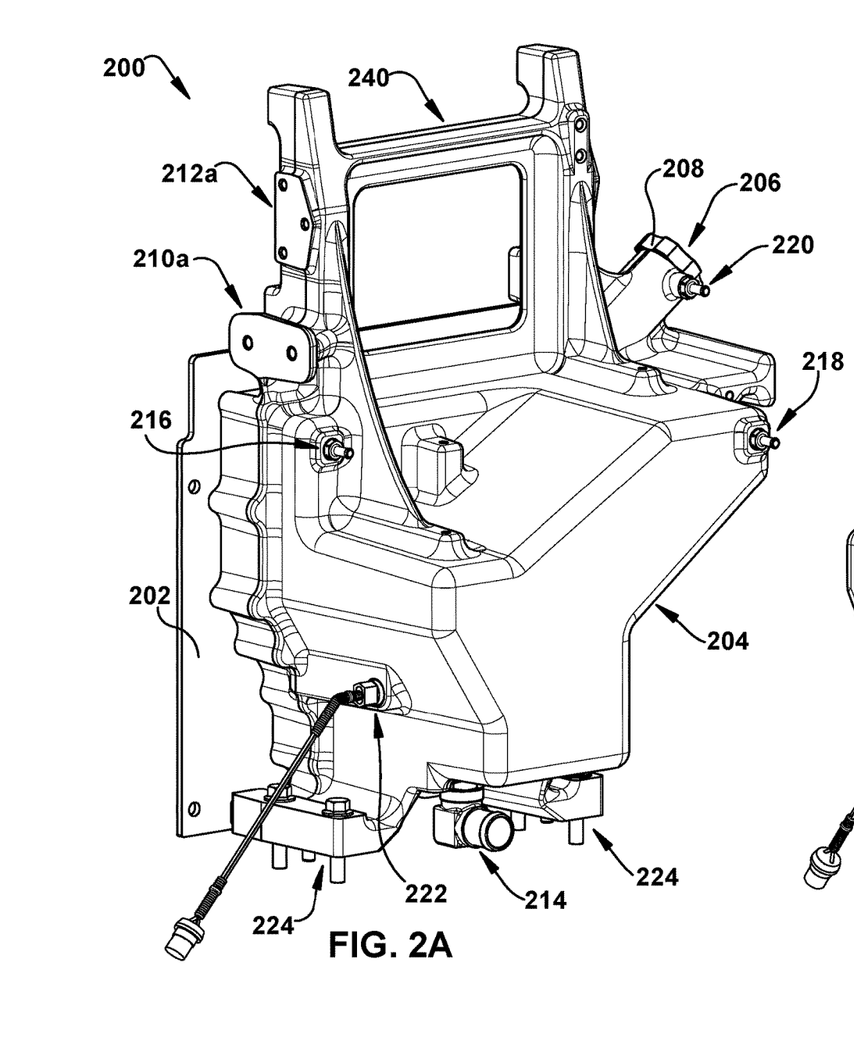
FIGS. 2A, 2B, and 2C are component diagrams illustrating one implementation of one or more portion of an example coolant reservoir system described herein.
Figure 2B:
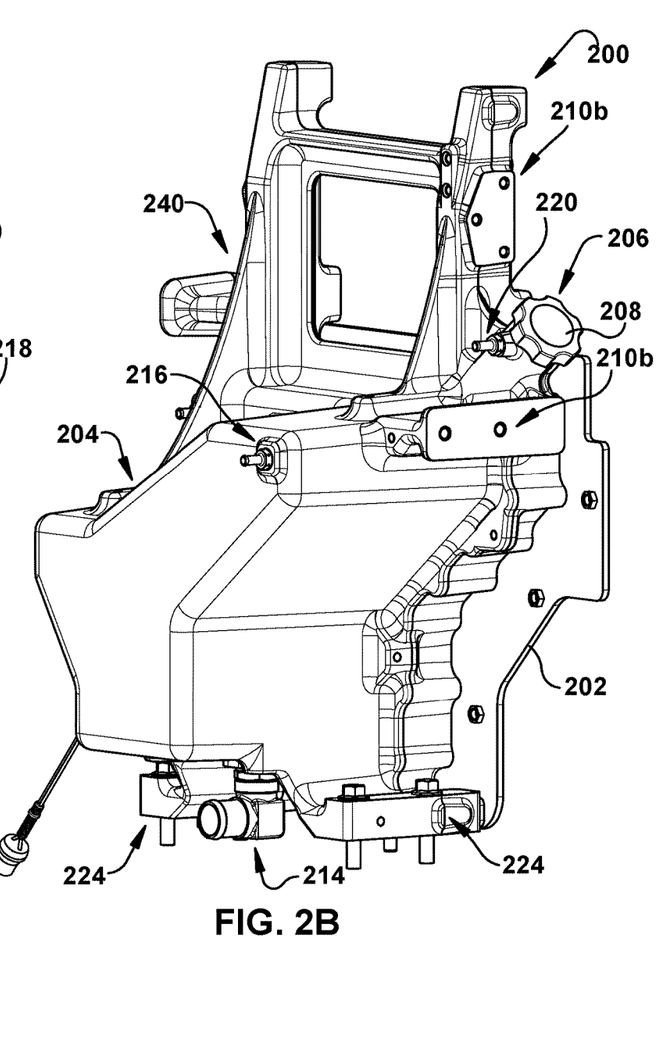
Figure 2C:
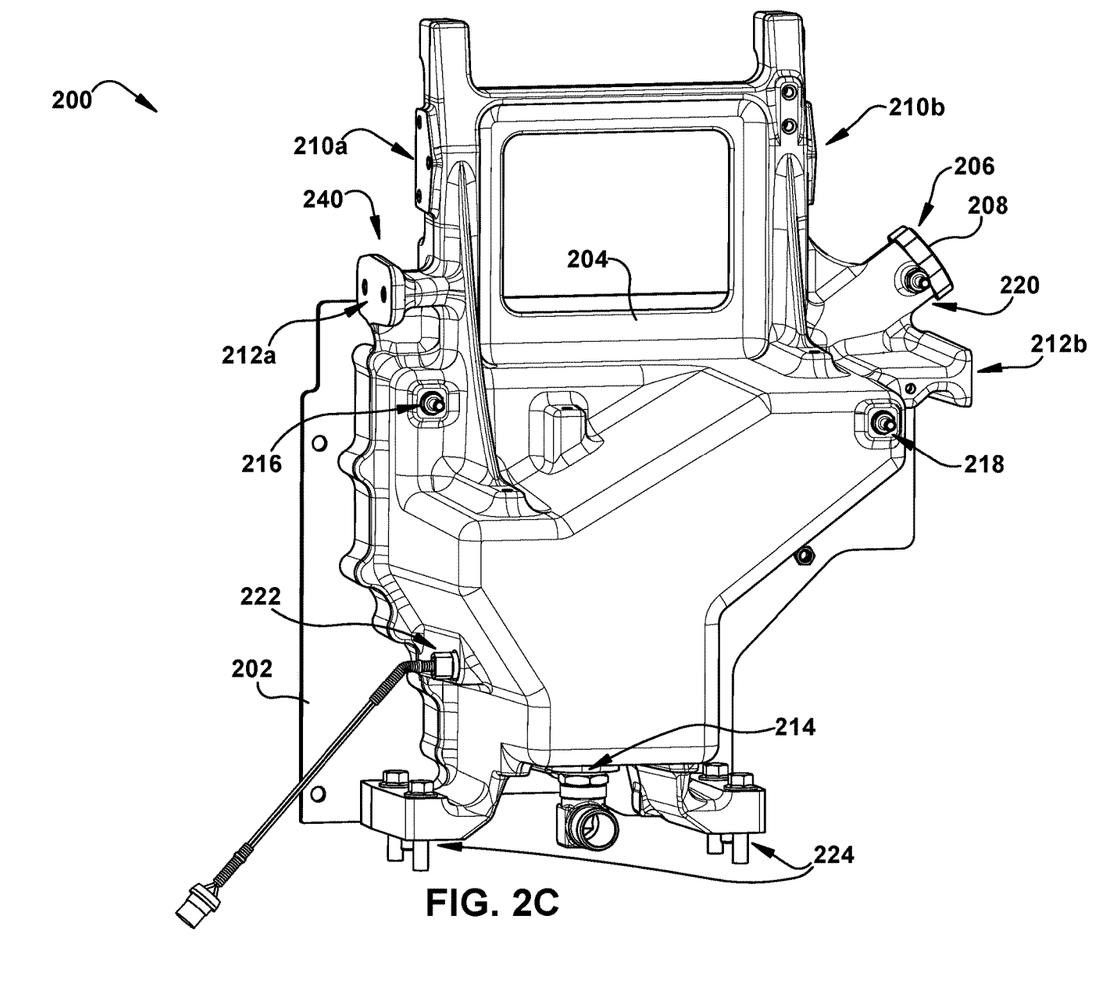

Further, in this implementation, the coolant reservoir system 200 comprises a coolant reservoir component 204 that is operably engaged with the firewall panel 202 to form a coolant reservoir 240. The coolant reservoir component 204 comprises a fill port 206 that is used to operably add coolant to the coolant reservoir 240. That is, for example, a fill port cap 208 can be disposed on the fill port 206, and can be selectably removed to add coolant to the reservoir 240. In some implementations, the fill port cap 208 can comprise a pressure cap that is configured to release pressure (e.g., and sometimes excess fluid) when the reservoir 240 (tank) is over pressurized or subjected directly to fluid. In this implementation, the coolant reservoir component 204 can comprise a rear surface that is configured to operably mate with the firewall panel 202, and the two components can be engaged together, such as with fasteners, etc. In this way, the firewall panel 202 forms a wall (e.g., rear wall) of the coolant reservoir 240, and the coolant reservoir component 204 forms the other walls of the coolant reservoir 240.

Figure 3:
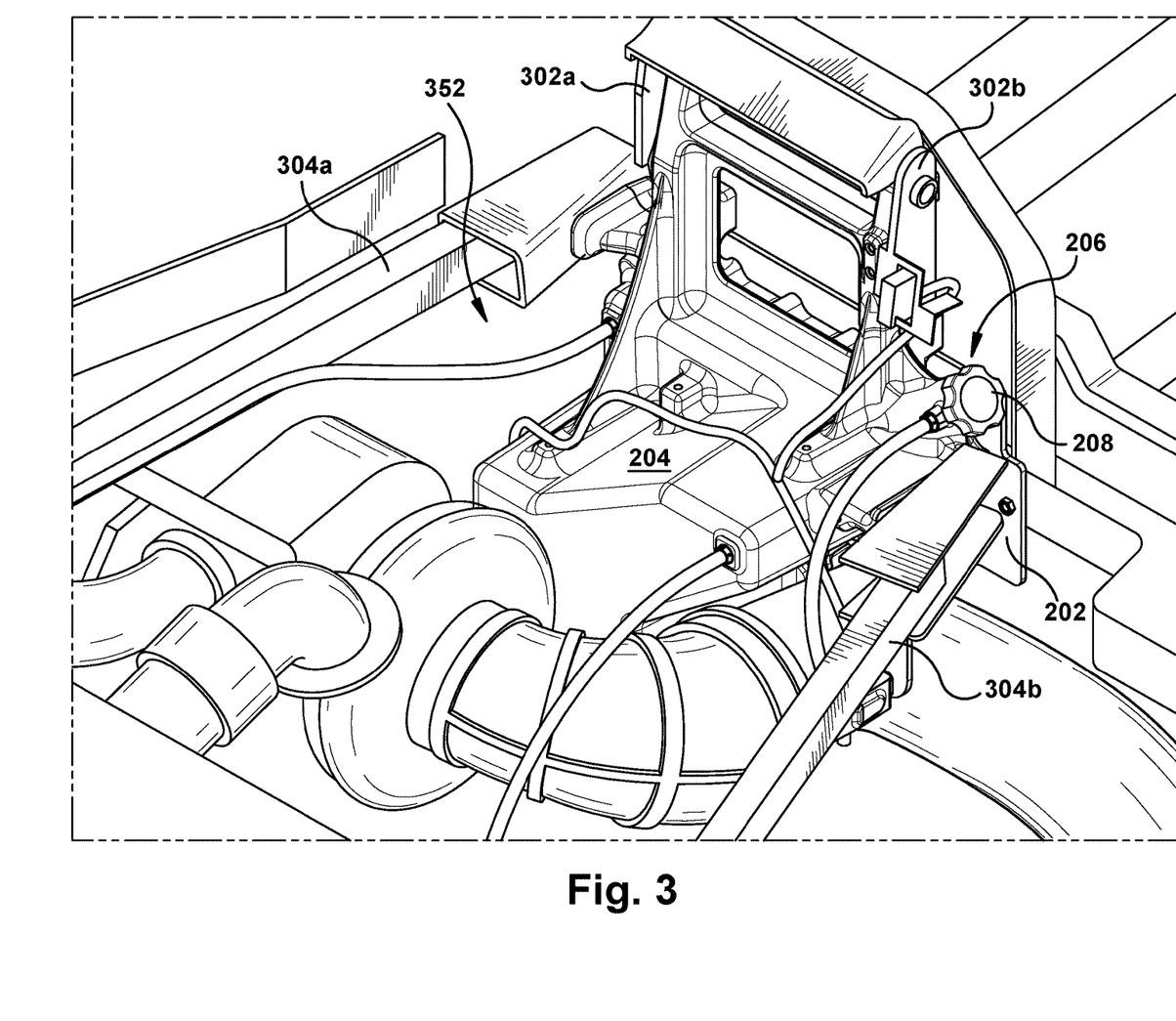
FIG. 3 is a component diagram illustrating one implementation of one or more portion of one or more systems described herein.
Figure 4A:
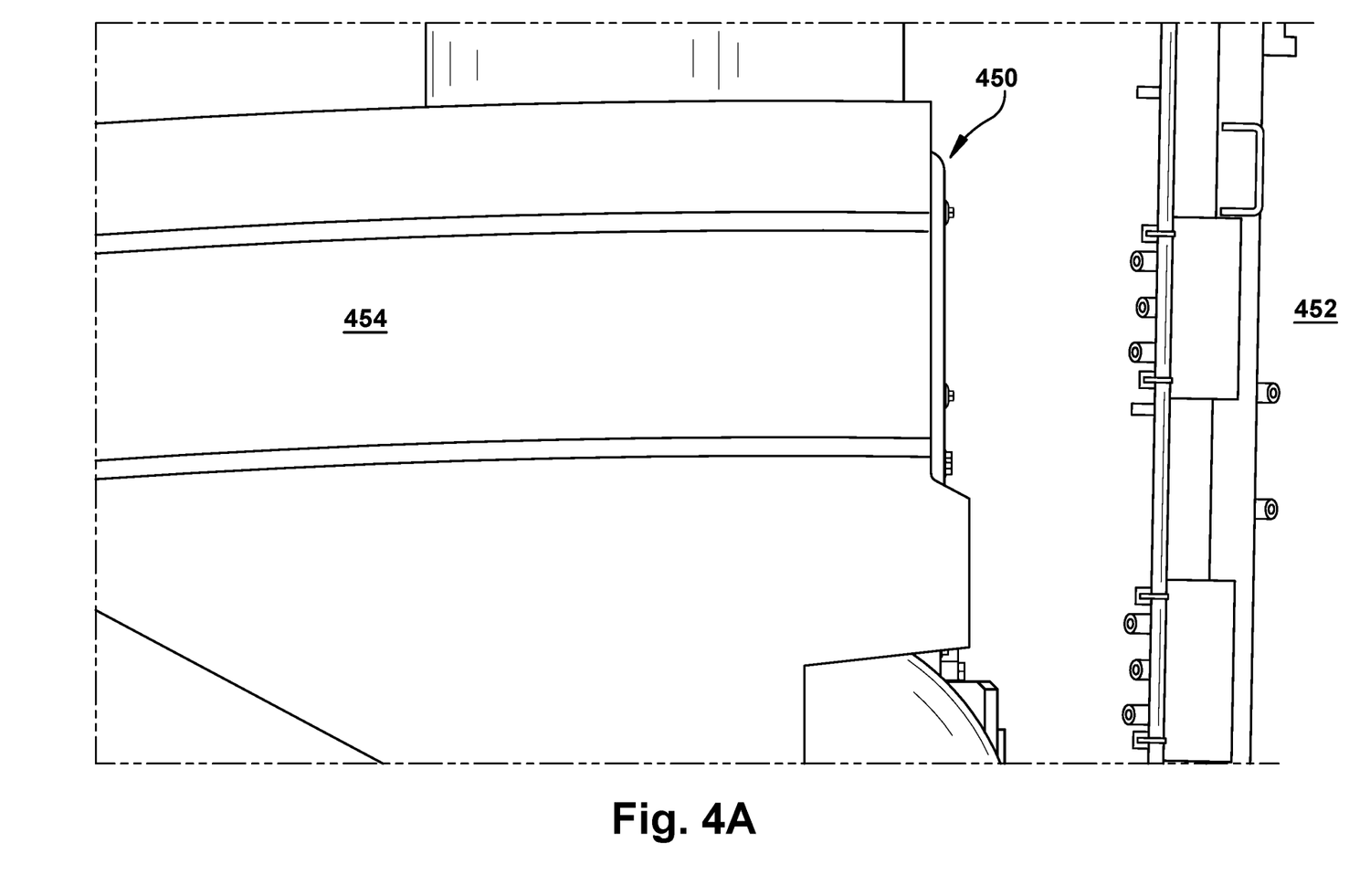
FIGS. 4A and 4B are component diagrams illustrating one implementation of one or more portion of one or more systems described herein.
Figure 4B:
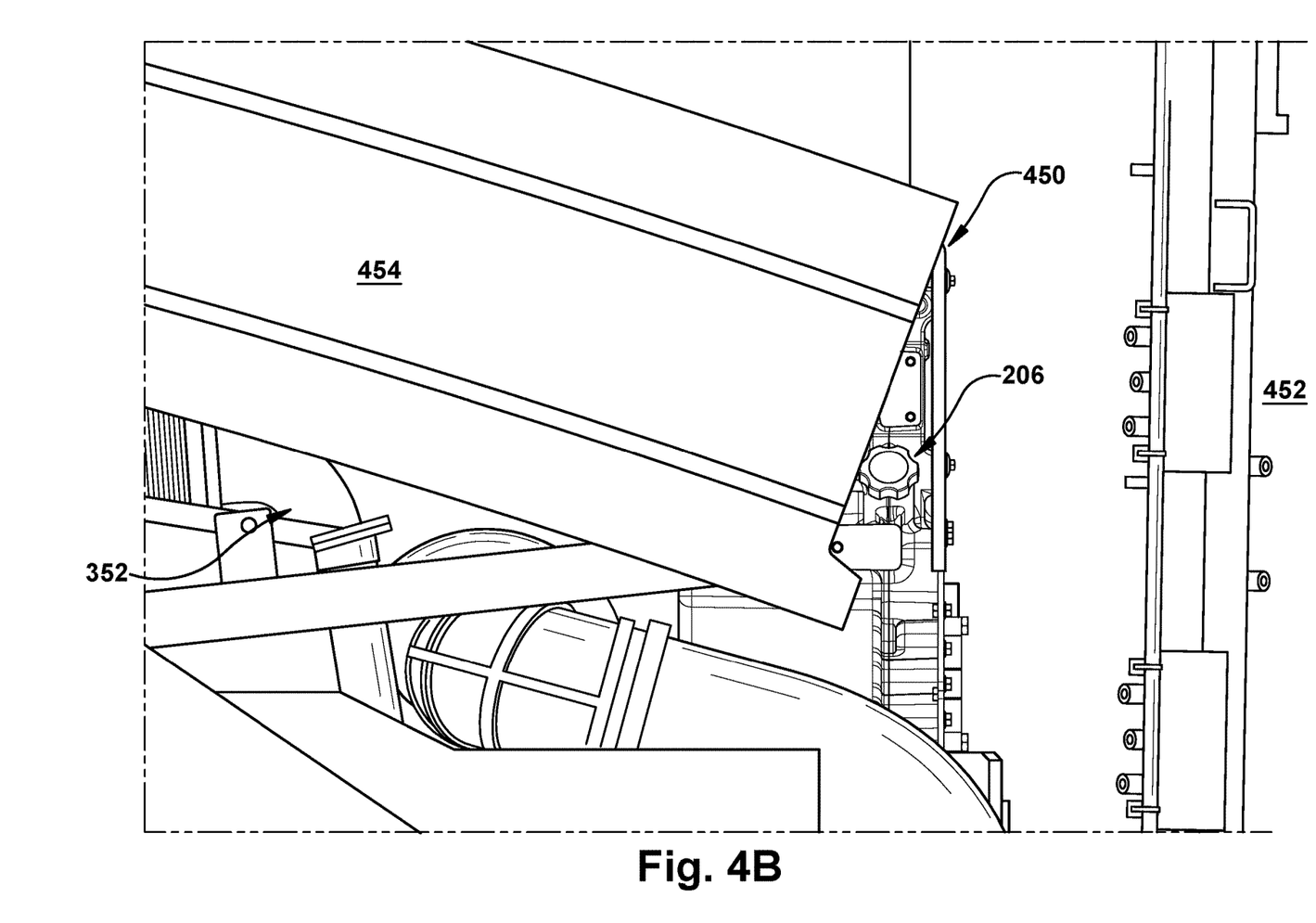

As illustrated in FIG. 3, the coolant reservoir component 204 is shaped and sized to operably fit inside the engine compartment 352. That is, for example, the coolant reservoir component 204 can be configured to allow for a more compact fit for other engine components, allowing for a smaller footprint for the engine compartment 352, and/or to allow for more components in the engine compartment 352. As illustrated in FIGS. 4A and 4B, the fill port 206 is disposed in the engine compartment 352 and is accessible when a hood 454 of the engine compartment 352 is disposed in an open position (e.g., as shown in FIG. 4B). That is, in a close position (e.g., as in FIG. 4A), the fill port 206 and fill port cap 208 are covered by the hood 454 in the engine compartment 352; and when the hood 454 is opened, the fill port cap 208 can be accessed, such as for filling the reservoir with coolant.

Figure 5A:
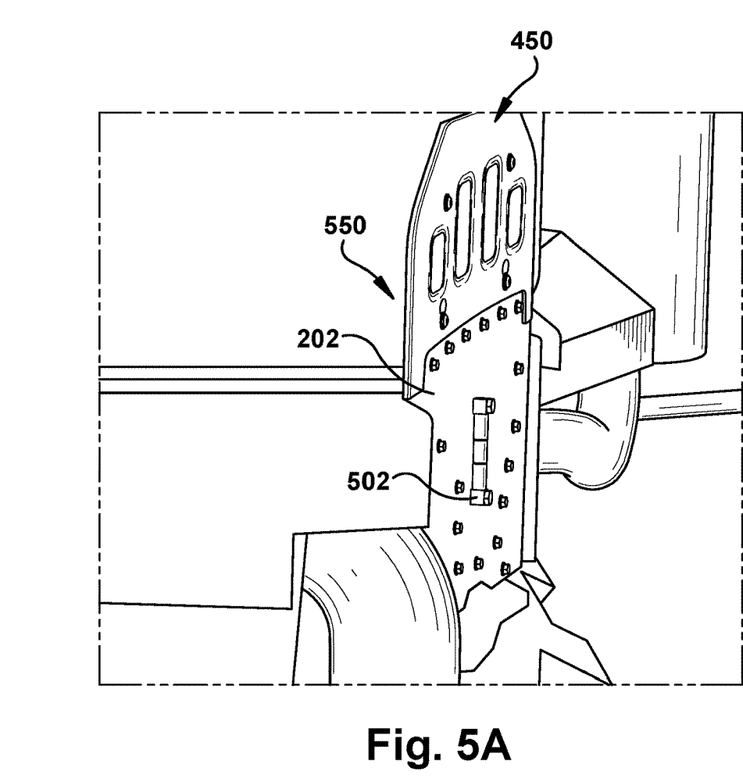
FIGS. 5A and 5B are component diagrams illustrating one implementation of one or more portion of one or more systems described herein.
Figure 5B:
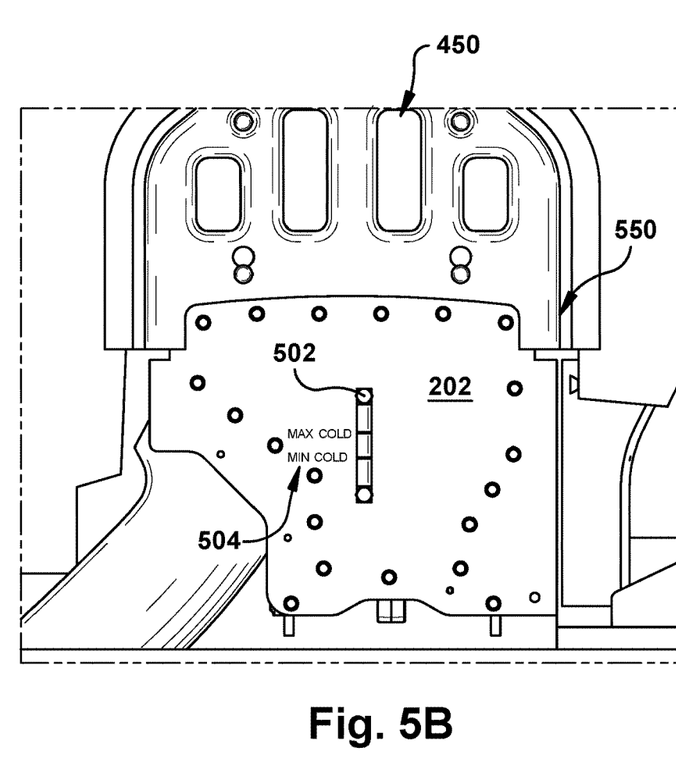

In some implementations, as illustrated in FIGS. 5A and 5B, the coolant reservoir system 200 can comprise a fill level indicator 502 that is disposed on a rear side 550 of the firewall panel 202, in the firewall 450. In this example, the fill level indicator 502 can be used to operably, visually indicate a level of coolant disposed in the coolant reservoir 240. As illustrated, in some implementations, the fill level indicator 502 can comprise a sight glass, for example, that is fluidly coupled with the inside of the coolant reservoir 240 to provide a visual indication of a fluid level in the tank. In other implementations, the indicator 502 can comprise any form that provides a visual indication, such as an analog dial, meter, or other, or a digital screen or lighted display identifying the fluid level in the tank. Further, as illustrated, a high and low level indication or marking 504 can be provided to visually indicate to the operator of a suggested high and low level for coolant fluid in the tank. As one example, the fill level indicator 502 (e.g., sight glass) may be visible to an operator of the vehicle, such as from the operator position (e.g., in the cab) when the hood of the vehicle is closed. In this way, in this example, fluid levels can be checked without needing to open the hood, remove any covers, and/or leave the operator position.

Figure 6:
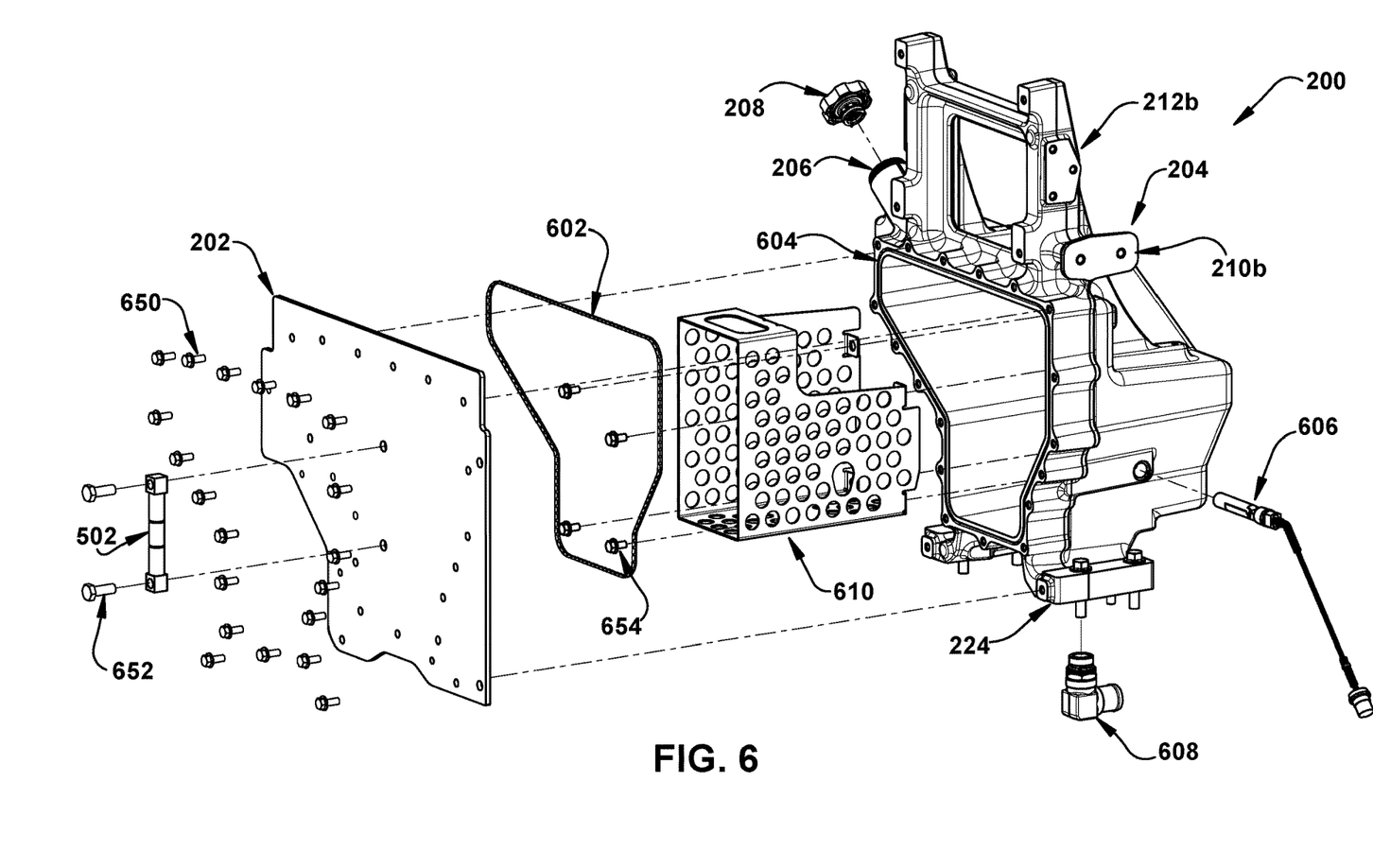
FIG. 6 is a component diagram illustrating an exploded view of one implementation of an example coolant reservoir system described herein.

FIG. 6 is a component diagram illustrating an exploded view of an example coolant reservoir system (e.g., 200), as described herein. As illustrated, the example coolant reservoir system 200 comprises the firewall panel 202 (rear wall) and the coolant reservoir component 204. In some implementations, the coolant reservoir component 204 can be formed as a one-piece component that forms a bulk of the coolant reservoir 240. As an example, the coolant reservoir component 204 can be formed from a casting process, using iron or steel, such as gray iron or ductile iron. For example, gray iron may provide for an easier manufacturing process, and can provide a stronger product than ductile iron; and a ductile iron reservoir is easier and cheaper to make than a polypropylene bottle. In some implementations, the coolant reservoir component 204 can be made from a polymer, such as one that can withstand higher temperatures, using injection molding. However, the cast iron body, for example, may provide superior support and can be easily painted and/or treated.

As an example, the firewall panel 202 can be comprised of a high strength steel (e.g., grade 50 ksi yield strength), to provide for support. In some examples, the steel firewall panel can be engineered to a desired thickness that meet sound engineering principles for the target system. That is, the thickness of the firewall panel is configured to at least be appropriate for the expected pressures experienced by the system. In some examples, the firewall panel can be from four to eight millimeters in thickness (e.g., about six millimeters). In other implementations the thickness may be more or less than this range depending on the expected target pressure use for the pressure vessel, such as the coolant reservoir 240. For example, the steel plate can be stamped to form, and in some implementations, the high and low level markings 504 can be stamped on the rear side of the firewall 550. Further, for example, an electro-coating can be applied (e.g., or other appropriate paint), to mitigate physical damage and/or corrosion.

Figure 7A:
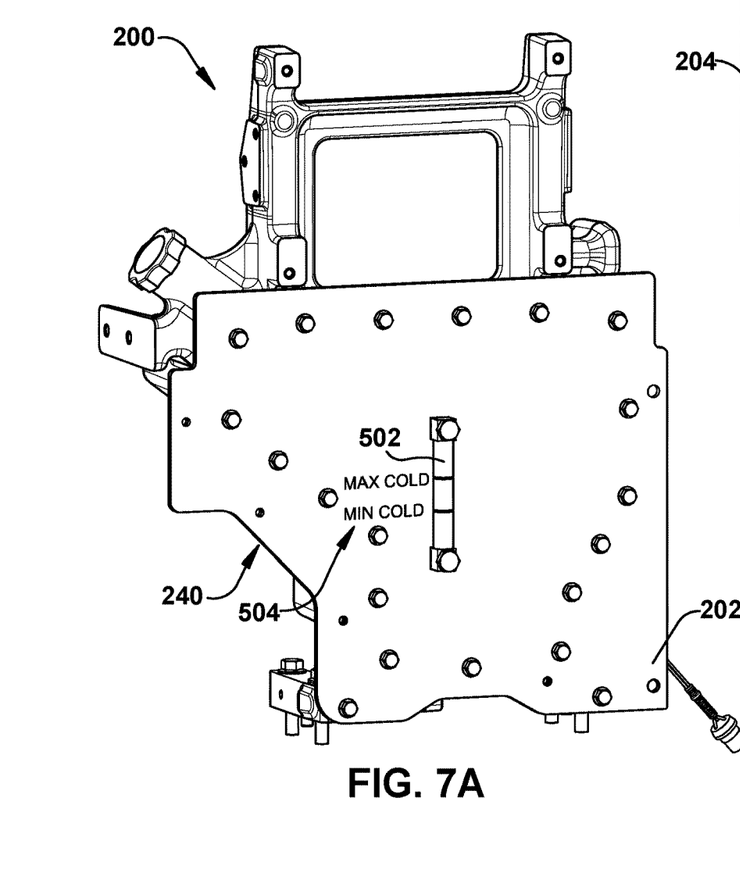
FIGS. 7A and 7B are component diagrams illustrating one implementation of one or more portion of one or more systems described herein.
Figure 7B:
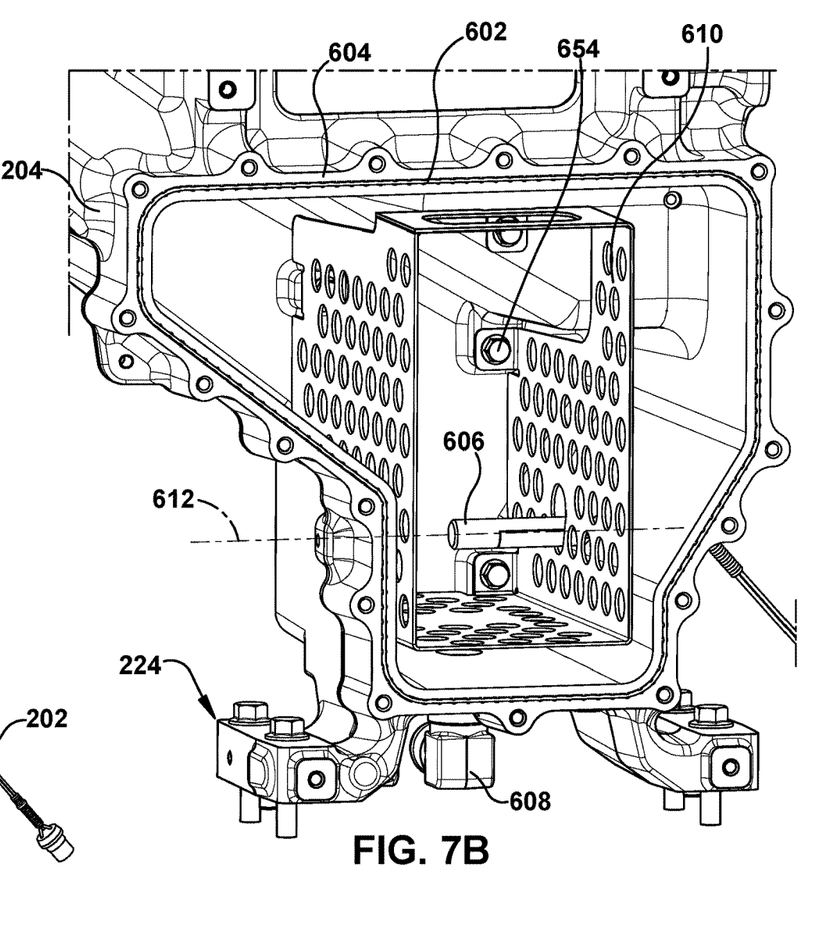

As illustrated in FIGS. 6, 7A and 7B, the coolant reservoir system 200 can comprise a gasket 602 disposed between the firewall panel 202 and the coolant reservoir component 204. The gasket 602 can comprise a material that is sufficient to withstand the coolant fluid temperatures, and is used to mitigate fluid leakage. The gasket 602 can be seated in a channel or grove 604 disposed around the perimeter of the rear (open) side of the coolant reservoir component 204. In combination, the gasket 602 provides a seal between the firewall panel 202 and the coolant reservoir component 204, which can be selectably fastened together using a plurality of fasteners 650. As illustrated, the fluid level indicator 502 can be fastened to the rear side 550 of the firewall panel 202 using one or more fasteners 652. As described above, the fluid level indicator 502 can be fluidly coupled to the inside of the coolant reservoir 240, such through vias in the firewall panel 202.

Further, as illustrated, in some implementations a deaeration baffle 610 can be fixedly disposed inside the coolant reservoir 240. The deaeration baffle can comprise a series of steel plates fixed together, where the plates comprise a plurality of holes to allow for fluid flow therebetween. In this way, for example, the baffles can mitigate excess movement (e.g., sloshing) of the fluid disposed inside the tank 240 during operation. That is, for example, as the vehicle is jostled during operation over uneven terrain, the fluid tends to slosh back and forth, etc., which can entrain air bubbles in the fluid. Air in the coolant fluid is undesirable due to the lower cooling properties, and potential damage to the water pump, as well as potential air lock in parts of the coolant system. As illustrated, the baffle 610 can be fastened inside the coolant reservoir 240, such as using fasteners 654 to fasten it to the inside of the coolant reservoir component 204.

In this implementation, the fluid level sensor 606 can be disposed inside the coolant reservoir. In this example, the fluid level sensor 606 is disposed in the coolant reservoir 2240 at a low coolant level to detect the level of coolant at the low level. In some implementations, the coolant reservoir component is shaped to the fluid level sensor to detect the level of coolant at the low coolant level 612 when the amount of coolant in the coolant reservoir is at least above a low coolant level 612 when the engine compartment is rotated up to thirty degrees from horizontal. That is, for example, the interior shape of the coolant reservoir 340 can be shaped to allow coolant at the low level 612 to remain in contact with the level sensor 606 even when the coolant reservoir 240 is tilted up to 30 degrees from horizontal. In this way, for example, when traveling on uneven terrain, when the coolant level is at or near the low level 612, the level sensor will still indicate the presence of coolant. As an example, when the level sensor 606 indicates that no coolant is present (e.g., it is below the low coolant level 612), internal systems of the vehicle may shut down, or severely limit, the operation of the vehicle, even though coolant may still be present in the system.

Figure 8A:
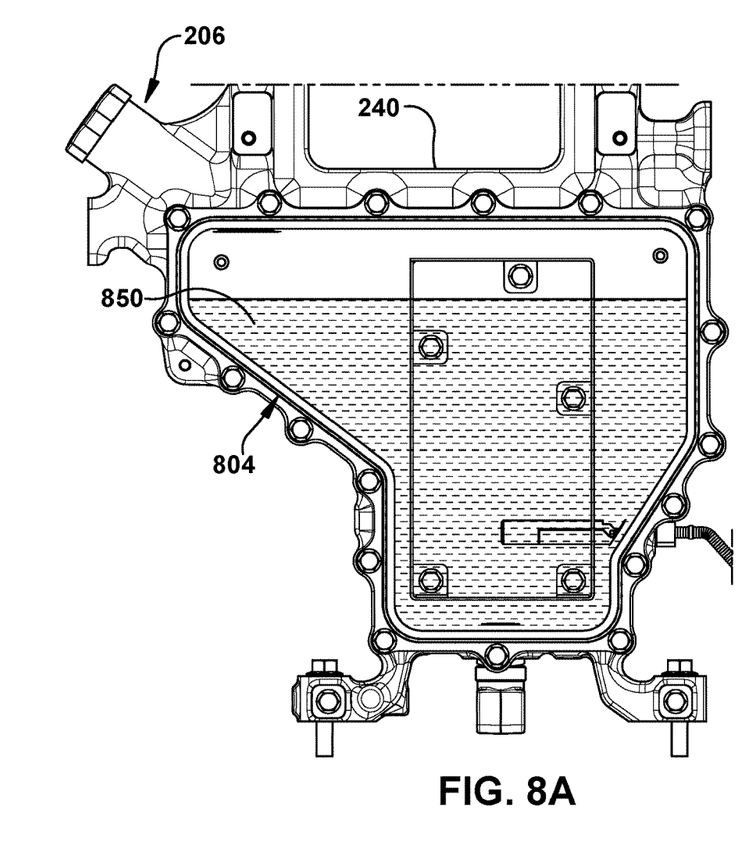
FIGS. 8A and 8B are component diagrams illustrating one implementation of one or more portion of one or more systems described herein.
Figure 8B:
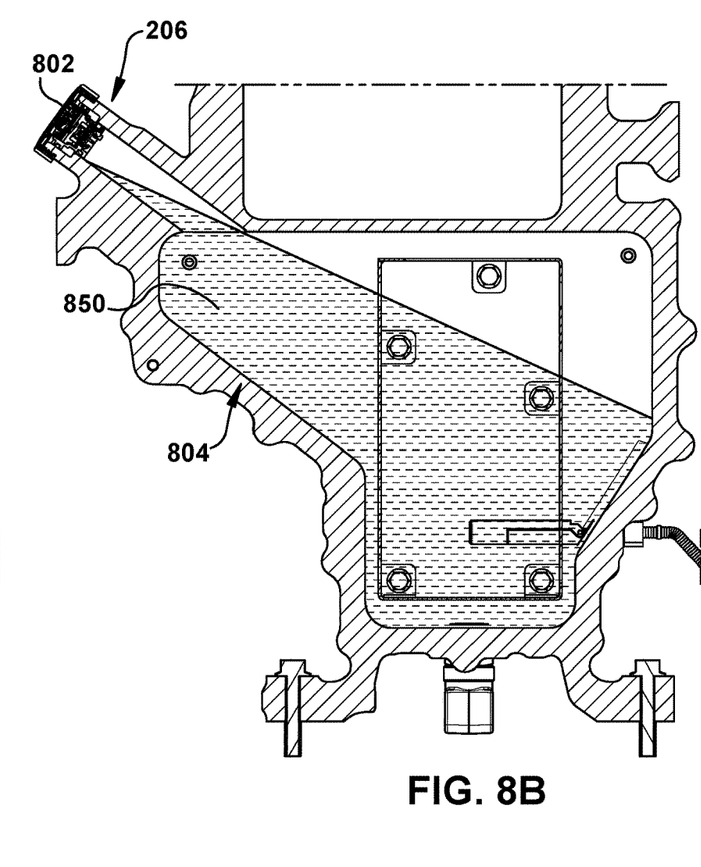

Additionally, as illustrated in FIGS. 8A and 8B, the shape of the coolant reservoir 240 can help mitigate loss of coolant through a pressure cap 802 on the fill port 206 when the engine compartment is rotated up to thirty degrees from horizontal, while maintaining sufficient coolant pressure. That is, for example, as illustrated in FIG. 8A, when operating on a horizontal plane the coolant 850 remains in a horizontal position. However, when the vehicle is tilted (e.g., rolled or pitched), as illustrated in FIG. 8B, the coolant 850 will attempt to stay in a horizontal position. As such, the coolant 850 will flow into the fill port 206, which can lead to expelling of the hot fluid from the pressure cap 802, which may be undesirable. In this implementation, an enlarged lobe 804 is present in the coolant reservoir, which allows for a block of the fluid 850 to remain in the tank 240, and mitigates fluid flowing into the fill port, even up to 30 degrees of tilt.

Returning to FIGS. 2A, 2B, 2C, and 3, with continued reference to FIG. 6, the coolant reservoir component 204 can comprise one or more structural attachment points 210, 212. The structural attachment points 210, 212 can be formed into the coolant reservoir component 204, for example, when the component 204 is formed as a one-piece unit. In this implementation, the attachment points 210, 212 provide structural support to which one or more vehicle frame-mounted components can be operably mounted. For example, a pair of hood pivot attachment points 210a, 210b (e.g., support attachment points) can be used to attach a hood support 302a, 302b for the vehicle hood 454. Further, a pair of frame/fender attachment points 212a, 212b (e.g., support attachment points) can be used to attach a frame support 304a, 304b, to which vehicle fenders or other components can be mounted.

Further, one or more frame support elements 224 (e.g., feet) can be disposed at the bottom portion of the coolant reservoir component 204. The frame support elements 224 can be operably mounted to the frame of the vehicle in the engine compartment 152, 352 to stabilize and provide support to the coolant reservoir system 200. Additionally, the coolant reservoir component 204 can be formed with a first port 216 (e.g., engine thermostat port) that is operably receiving fluid from an engine thermostat in the coolant system. The coolant reservoir component 204 can be formed with a second port 218 (e.g., radiator port) operably receiving fluid from a radiator in the vehicle. The coolant reservoir component 204 can be formed with a third port 214 (e.g., water pump port) operably, fluidly coupled with a water pump. In some implementations, a water pump fitting 608 can be operably engaged with the third port 214. An over flow port 220 can be disposed in the fluid fill port 206, to allow for an overflow of coolant to flow from the tank.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for a vehicle engine coolant tank, the system comprising:
    a firewall panel disposed at a rear end of an engine compartment;
    a coolant reservoir component operably engaged with the firewall panel to form a coolant reservoir, the coolant reservoir component comprising a fill port to operably add coolant to the coolant reservoir;
    wherein the firewall panel forms a wall of the coolant reservoir; and
    wherein the coolant reservoir component is shaped and sized to operably fit inside the engine compartment.

2. The system of claim 1, wherein the fill port is disposed in the engine compartment and is accessible when a hood of the engine compartment is disposed in an open position.

3. The system of claim 1, comprising a fill level indicator disposed on a rear side of the firewall panel, the fill level indicator operably, visually indicating a level of coolant disposed in the coolant reservoir.

4. The system of claim 3, the fill level indicator comprising a sight glass.

5. The system of claim 1, the coolant reservoir component comprising a component that is formed as one-piece.

6. The system of claim 1, wherein the shape of the coolant reservoir mitigates loss of coolant through a pressure cap on the fill port when the engine compartment is rotated up to thirty degrees from horizontal, while maintaining sufficient coolant pressure.

7. The system of claim 1, the coolant reservoir component comprising one or more structural attachment points formed into the coolant reservoir component, wherein the attachment points provide structural support to which one or more vehicle frame-mounted components can be operably mounted.

8. The system of claim 7, wherein the one or more structural attachment points formed into the coolant reservoir component comprise attachment points sufficient to support one or more of:
    one or more engine compartment hood pivots;
    one or more fender support frames; and
    one or more engine components.

9. The system of claim 1, comprising a deaeration baffle disposed in the coolant reservoir.

10. The system of claim 1, comprising a gasket sufficient to withstand the coolant fluid temperatures disposed between the firewall panel and the coolant reservoir component to mitigate fluid leakage.

11. The system of claim 1, comprising a fluid level sensor disposed in the coolant reservoir at a low coolant level to detect the level of coolant at the low level.

12. The system of claim 11, the coolant reservoir component shaped to allow the fluid level sensor to detect the level of coolant at the low coolant level when the amount of coolant in the coolant reservoir is at least above a low coolant level when the engine compartment is rotated up to thirty degrees from horizontal.

13. The system of claim 1, the coolant reservoir component comprising two or more of:
    a first port operably receiving fluid from an engine thermostat;
    a second port operably receiving fluid from a radiator; and
    a third port operably, fluidly coupled with a water pump.

14. A coolant fluid tank for a vehicle, comprising:
    a rear wall that operably forms at least a portion of a firewall at a rear of an engine compartment for a vehicle;
    a one-piece tank component engaged with the rear wall to form a coolant reservoir in the engine compartment, the tank component comprising a radiator port to receive fluid from the radiator, and a water pump port disposed at a bottom of the tank component to provide fluid to a water pump; and
    a gasket disposed between the rear wall and the tank component to operably mitigate fluid leakage.

15. The tank of claim 14, comprising a deaeration baffle operably engaged with the tank component inside the coolant reservoir.

16. The system of claim 14, comprising a fill level indicator disposed on a rear side of the rear wall, the fill level indicator operably, visually indicating a level of coolant disposed in the coolant reservoir.

17. The system of claim 14, comprising a fill port disposed at a top portion of the tank component, and wherein the shape of the coolant reservoir mitigates loss of coolant through a pressure cap on the fill port when the engine compartment is rotated up to thirty degrees from horizontal, while maintaining sufficient coolant pressure.

18. The system of claim 14, the tank component comprising one or more structural attachment points formed into the coolant reservoir component, wherein the attachment points provide structural support to which one or more vehicle frame-mounted components can be operably mounted.

19. The system of claim 14, comprising a fluid level sensor disposed in the coolant reservoir at a low coolant level to detect the level of coolant at the low level when the engine compartment is rotated up to thirty degrees from horizontal.

20. A system for a vehicle engine coolant tank, the system comprising:
- a rear wall comprising at least a portion of a firewall panel disposed at a rear end of an engine compartment of a vehicle;
- a one-piece coolant reservoir component operably engaged with the rear wall to form a coolant reservoir, the coolant reservoir component comprising a fill port to operably add coolant to the coolant reservoir, the coolant reservoir component further comprising one or more structural attachment points formed into the one-piece coolant reservoir component, wherein the attachment points provide structural support for operably mounting a vehicle frame-mounted component;
- a gasket disposed between the rear wall and the one-piece coolant reservoir component to mitigate fluid leakage;
- a fluid level indicator disposed on a rear side of the rear wall, the fill level indicator operably, visually indicating a level of coolant disposed in the coolant reservoir; and
- a fluid level sensor disposed in the coolant reservoir at a low coolant level to detect the level of coolant at the low level when the engine compartment is rotated up to thirty degrees from horizontal;
- wherein the shape of the coolant reservoir mitigates loss of coolant through a pressure cap on the fill port when the engine compartment is rotated up to thirty degrees from horizontal, while maintaining sufficient coolant pressure.

* * * * *